United States Patent [19]
Bankert et al.

[11] Patent Number: 5,659,746
[45] Date of Patent: Aug. 19, 1997

[54] METHOD FOR STORING AND RETRIEVING DIGITAL DATA TRANSMISSIONS

[75] Inventors: William Bankert, Byron; Bruce W. Leppla, San Francisco; Frederick W. Macondray, Mountain View; George Gioumousis, Palo Alto; Karel Jan Parcel, Cupertino, all of Calif.

[73] Assignee: Aegis Star Corporation, Palo Alto, Calif.

[21] Appl. No.: 367,058

[22] Filed: Dec. 30, 1994

[51] Int. Cl.⁶ ................................... G06F 17/30
[52] U.S. Cl. ................ 395/621; 395/610; 395/613; 380/25; 379/67; 379/88
[58] Field of Search ................... 395/600, 650, 395/610, 613, 621; 380/25; 379/89, 283, 67, 88, 93; 355/204

[56] References Cited

U.S. PATENT DOCUMENTS

| | | | |
|---|---|---|---|
| 5,191,611 | 3/1993 | Lang | 380/25 |
| 5,349,636 | 9/1994 | Irribarren | 379/89 |
| 5,392,336 | 2/1995 | Chang et al. | 379/93 |
| 5,442,771 | 8/1995 | Filepp et al. | 395/650 |
| 5,452,341 | 9/1995 | Sattar | 379/88 |
| 5,461,665 | 10/1995 | Shur et al. | 379/67 |
| 5,479,498 | 12/1995 | Brandman et al. | 379/283 |
| 5,500,715 | 3/1996 | Ta et al. | 355/204 |

FOREIGN PATENT DOCUMENTS

| | | | |
|---|---|---|---|
| 0417396 | 3/1991 | European Pat. Off. | G06F 15/401 |
| 0561364 | 9/1993 | European Pat. Off. | G06F 15/401 |

OTHER PUBLICATIONS

Grigsby, Mason: "Indexing Methodologies and Alternatives", *Cold—Computer Output to Laser Disk* no date.

*Primary Examiner*—Thomas G. Black
*Assistant Examiner*—C. Lewis
*Attorney, Agent, or Firm*—Fish & RIchardson P.C.

[57] ABSTRACT

A method for storing and retrieving electronically transmitted data through the use of distributed indices. Data to be stored is received and automatically stored and indexed on the basis of information contained within the data. Similarly, requests to retrieve data are received and automatically routed to the proper storage location on the basis of information contained within the data. The data to be retrieved is then compiled and automatically transmitted to the user. High speed search and retrieval of the data is possible by using different data fields to divide indices to the data into small functional groups and distributing these groups on processors and storage media relevant to the data's storage location. This index distribution ensures that individual indices retain a small memory size and directs the search to a particular processor, thus decreasing the time required to retrieve stored information. The storage and retrieval method has the ability to receive, examine and transfer data transmissions into storage with a minimum amount of material or labor, the ability to automatically create an index keyed to certain data fields, the ability to manipulate the index such that retrieval times are held constant independent of the volume of stored data, and the ability to automatically transmit requested data to a user.

9 Claims, 9 Drawing Sheets

Microfiche Appendix Included
(5 Microfiche, 301 Pages)

METHOD FOR STORING AND RETRIEVING DIGITAL DATA TRANSMISSIONS

The field of the invention relates generally to storing and retrieving digital data transmissions.

REFERENCE TO MICROFICHE APPENDIX

An implementation of the invention is found in a microfiche appendix, containing 5 microfiche and 301 frames.

BACKGROUND OF THE INVENTION AND PRIOR ART

The advent of network-based computer systems has increased dramatically the amount of data transmitted daily from user to user. Data which previously was transmitted by paper or voice systems can now be transmitted more efficiently by digital systems. A wide variety of data is capable of being transmitted in digital form, including text-based items such as electronic mail messages or electronic funds, graphics, sound and video.

The volume of digital data transmissions is growing annually and will continue to increase in the future as network and telecommunications systems become more popular in business and personal use. An increase in the installed base of computers will result in digital data transmissions becoming a major conduit for both business and personal transactions. The volume of transactions involving digital data transmissions will equal or supersede analog and other traditional data transmission methods such as voice or writing systems.

The increase in volume of digital data transmissions has created a concomitant increase in the volume of digital data that must be archived for both storage and retrieval. Yet despite this increase in digital data transmissions, no viable method currently exists to efficiently store and retrieve the data. The explosive growth in the volume of data required to be archived has created problems that current storage and retrieval methods cannot address, such as the need to capture large amounts of data, store and index that data in files, and organize the indexes in a manner which permits the high speed retrieval of the data from the files.

The concept of storing and retrieving digital data is well known. First, data is captured by an appropriate method and filed on media used for storing information. Second, the data is indexed by cross-referencing various attributes of the data with the storage location of the data. The index is normally collected in a database with appropriate fields for the data attributes and storage location. The database enables the fields to be manipulated to facilitate searching, sorting, recombination and similar activities.

Previous methods of storing and retrieving digital data transmissions were based on the use of paper, celluloid or computer media. None of these traditional storage and retrieval systems provide a rapid, efficient and reliable method of capturing the data, storing the data on appropriate media and accessing the data for future operations.

A popular method of storing and retrieving digital data transmissions prints the data on paper and stores it. The paper is sorted or collated, typically in paper folders. Next the paper is indexed manually into a database. Finally, the paper is stored in a filing cabinet.

Paper-based storage and retrieval systems do not offer a solution to the problem of creating a fast, efficient and reliable method of storing and retrieving digital data transmissions. Paper-based systems are material and labor intensive. The costs associated with paper, folders and filing cabinets increases at an uneconomical rate as the volume of digital data transmissions increases. The costs associated with providing personnel to convert the data, maintain the storage system and operate the index system are also high, with more personnel required to maintain both the storage of paper documents and the retrieval of those documents for future reference. Finally, any indexing scheme associated with a paper-based system does not permit rapid access to the data, as the index must be physically separated from the data. Both computer and written database indices in a paper-based system require a user to access the index, retrieve the appropriate record, and, by a separate process, match the record with the corresponding data storage location to physically retrieve the data.

In a celluloid-based storage and retrieval system, users make celluloid copies of digital data transmissions. A celluloid-based system is similar to a paper-based system, merely substituting celluloid media such as microfilm or microfiche instead of paper as the hard copy document capable of being stored and retrieved. In fact, most celluloid-based systems use paper as an intermediate transfer form: the digital data is first converted to paper form, then the paper is imaged onto the celluloid.

Celluloid-based storage and retrieval systems do not offer a solution to the problem of creating a fast, efficient, and reliable method of storing and retrieving digital data transmissions. Celluloid-based systems offer lower storage costs than paper-based systems, as less physical space is required to store the data. However, these cost savings are neutralized by the higher material cost per unit for celluloid such as microfilm and microfiche. In addition, imaging equipment required to convert the data from either digital or paper form to celluloid form is overly complex and expensive. The indexing scheme for a celluloid-based system presents the same inadequacies as the paper-based system, incurring labor and material costs and suffering the disadvantage of being physically separate from the stored data. Finally, retrieval of data stored in celluloid form is cumbersome and expensive, requiring sophisticated readers capable of both lighting and magnifying the data to a user-readable format.

The most advanced method of storing and retrieving digital data transmissions involves the use of a traditional computer system. Computer-based systems receive the data for storage and retrieval either directly from a computer platform, or indirectly by transferring the data to an imaging system and then transferring that image directly into the computer-based system.

Direct transfer of the data to a computer-based storage and retrieval system is a common method of manipulating digital data transmissions. The data is merely copied or moved from its storage location resident on one computer system to a storage location resident on another computer system.

Indirect transfer of data through the use of a document imaging system is another common method of manipulating digital data transmissions. A document imaging system converts hard copy documents to digital images that can be accessed and viewed on a computer workstation, stored on media, transmitted across computer networks, incorporated into software applications or printed. These systems typically utilize a scanner to digitize the images, an imaging file server computer to manage access to the images, a display device to view the images, a storage system to store the image such as magnetic disks, tapes or optical drivers and a printer to reproduce the images.

Traditional computer-based storage and retrieval systems do not offer a solution to the problem of creating a fast, efficient, and reliable method of storing and retrieving digital data transmissions. The transfer of data, either directly from one computer platform to another, or indirectly by transferring the data to a hard copy document and then converting the document to digital form, is a time consuming and expensive process. Also, data stored directly is inadequate as a system of archiving large volumes of digital data transmissions because the stored data cannot be readily manipulated. A direct transfer of digital data from one computer to another merely deposits the data in some storage location on the new computer system. No specialized index is automatically created to relate this data to its storage location other than the rudimentary filing system used by the computer.

In addition to the individual inadequacies of the traditional paper, celluloid, or computer-based digital database storage systems, all of the current systems possess common problems with their indexing scheme. If the index is manually written and operated, retrieval times are excruciatingly slow, as an operator must examine the index, locate all records relevant to a retrieval request, retrieve all of the relevant stored data and prepare the retrieved data for re-transmission to the user.

Similarly, if the index is created using a computer, existing database architectures such as a flat file architecture, a hierarchical architecture, a relational architecture and an object-oriented architecture require large amounts of data to be searched for each retrieval request.

The simplest index system uses a flat file database architecture. This architecture represents a simple file which associates the data to corresponding information on index keys. A flat file database stores, organizes, and retrieves information from one file at a time. All data or records within these files must be accessed sequentially. Thus, to read or store the last record, all previously stored records must be read or accessed first.

A more sophisticated index system uses a hierarchical database architecture. A hierarchical architecture groups records in an interrelated, tree-like structure. A hierarchical architecture descends from a main, or root, data field. Each successively lower-ordered data field is a subsidiary that branches from the higher-ordered data field. Every data field except the root can contain either higher or lower-ordered data fields. Records in a hierarchical database can be stored with a variety of index keys to enable easier reference and faster access to desired data by focusing on relevant structures within the database.

Another more sophisticated index system uses a relational database architecture. A relational database stores information in tables, or rows and columns of data. In a relational database, the rows of a table represent records, or collections of information about separate items, and the columns represent fields or particular attributes of a record. In conducting searches, a relational database matches information from a field in one table with information in a corresponding field of another table to produce a third table that combines requested data from both tables.

Finally, recent computer index systems have used an object-oriented database architecture. An object-oriented architecture allows the modeling of complex data sets by incorporating a computer program into the index. To search the index, the program reads an object, operates on that object, selects the data, and places the object back into the database.

The existing database architectures each possess flaws. Flat file systems are adequate to manage small sets of data with few requirements for complex searches or queries. However, flat file systems become increasingly cumbersome as the size of the database grows and the demand increases for more flexible queries arises. Hierarchical systems are well-suited for organizing information that breaks down logically into successively greater levels of detail. Random or complicated data structures, though, cannot utilize the features of a hierarchical system and search times become increasingly slow. Relational systems allow the rapid retrieval of small sets of data, yet become cumbersome when attempting to manipulate large amounts of data. Finally, search and retrieval operations in object-oriented systems are too complicated, requiring the use of experienced computer programmers to write and execute programs specifically designed for each individual search.

Also, computer applications using the traditional index systems place the entire index to the database alongside the stored data in single location, such as on a single disk drive or single database server. As the volume of data stored by the system increases, the database index similarly increases in size. A large index is unmanageable and does not permit rapid access to the stored data. Thus, search times for a traditional database architecture to write a particular item of data within an index that is many terabytes in size can take several minutes. The use of a system designed to process tens of thousands of requests a day would not be feasible if individual searches require several minutes of access time.

For the foregoing reasons, there is a need for a fast, efficient, and reliable method for storing and retrieving digital data transmissions. Such a method would confine the advantages of directly storing data from one computer system to another computer system with an indexing system that allows the rapid search of data yet does not become more cumbersome to manipulate with each successive stored record.

A viable method for storing and retrieving digital data transmissions would possess the following capabilities: the ability to receive, examine and transfer transmissions of data into storage with a minimum amount of material or labor; the ability to automatically create an index keyed to certain data fields; the ability to use the index in such a manner that retrieval times are held constant independent of the volume of stored data; and the ability to automatically transmit the requested data to a user.

BRIEF DESCRIPTION OF THE INVENTION

The present invention provides a method for storing and retrieving data containing user designation information and various fields, including a data identification field and other information fields. When the present invention receives the data to be stored, that data is examined to determine the user designation and contents of the data identification field. These two items of information determine a unique item or set of items of storage media; the present invention selects the item or items of storage media and stores the data on that media. The present invention retrieves data in a manner similar to the storage process, selecting the appropriate item or items of storage media designated according to the user designation and data identification field, then locating and retrieving the stored data on that media. The present invention solves the data capture problems of prior art systems by enabling the direct transfer of data from the user to the storage system, and satisfies the retrieval problems by the use of an innovative distributed indexing system.

BRIEF DESCRIPTION OF THE DRAWINGS

The present invention will be better understood by reference to the accompanying drawings in which.

DETAILED DESCRIPTION OF A PREFERRED EMBODIMENT OF THE INVENTION

Figure 1:
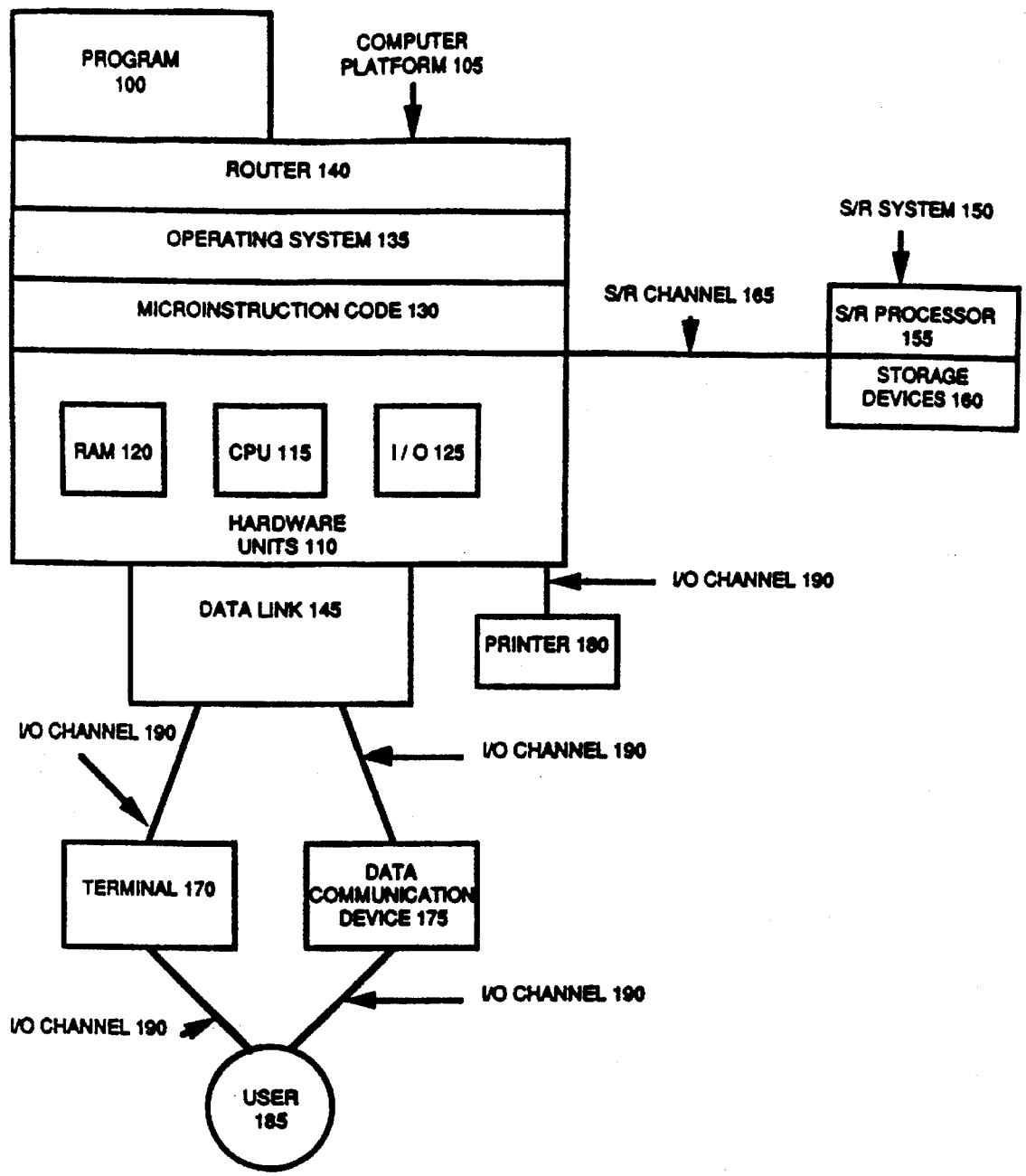
FIG. 1 is a block diagram of the apparatus used for the present invention.

As shown in FIG. 1, the method of the present invention employs a computer program 100 which operates on a computer platform 105. The computer platform 105 includes hardware units 110 including a central processing unit (CPU) 115, a random access memory (RAM) 120, and an input/output interface 125.

The computer platform 105 also includes microinstruction code 130, an operating system 135, a data router 140, a data link 145, and a storage/retrieval system 150. Storage/retrieval system 150 includes a storage/retrieval processor 155 and data storage devices 160, and is connected to computer platform 105 through a storage/retrieval channel 165. Various peripheral components are connected to computer platform 105, including a terminal 170, a data communications device 175, and a printer 180.

The preferred embodiment of the computer platform and hardware used in the method of the invention includes the following:

A Unix Sun SPARC workstation computer with at least 64M of RAM;

A telecommunications device;

A storage Jukebox system containing write-once, read-many (WORM) optical storage disks; and A local area network (LAN) to connect the various peripheral and hardware devices to the Sun workstation. Users 185 interact with the computer platform 105 and the computer program 100 via terminal 170 or data communication device 170 through an input/output channel 190.

The preferred embodiment also utilizes a computer program written in the C++ programming language and designed to be supported by a Unix-based operating system.

In order better to describe the invention's storage and retrieval process, the following terms are defined:

The user designation is a unique string of alphanumeric characters or representation thereof that identifies a particular user of the present invention. The user designation is analogous to an account code used with many popular computer applications.

The data identification value is a string of alphanumeric characters that allows a user to identify the transmitted data in a consistent manner.

The various data values are strings of alphanumeric characters that allow a user to classify the data according to conventions chosen by the user.

The body of information or data represents the main item of information the user transmits to the present invention, including text, sound, graphics, or other information.

The storage family value is a unique string of alphanumeric characters used to designate a storage device available to the user. The storage device can be dedicated to a single user, or open to multiple pre-defined users.

The processor value is a string of alphanumeric characters that designates the current storage device associated with the user identification value with empty memory space available to store the downloaded data.

The volume identification value is a unique string of alphanumeric characters that represents the selected storage device and distinguishes this particular storage device from all other storage devices.

OPERATION OF THE DATA LINK

Figure 2:
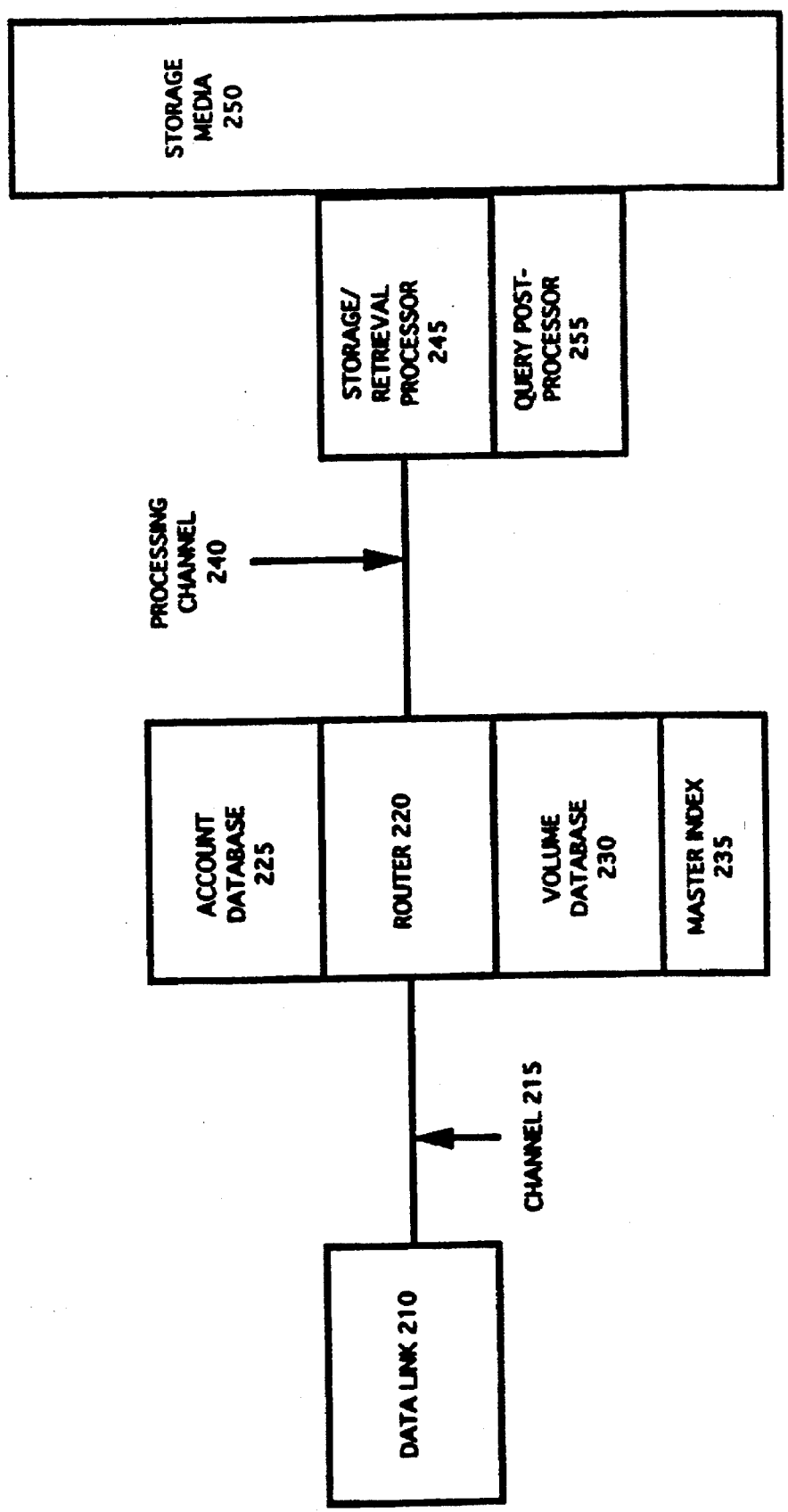
FIG. 2 is a diagram representation of the functional structure and operation of the method of storing and retrieving data according to the present invention.

FIG. 2 is a diagram representation of the functional structure and operation of the method of storing and retrieving digital data transmissions according to the present invention. Typically, digital data required to be stored is transmitted electronically by an external user to a data link 210.

Storage and retrieval through the data link operates in a simple manner. A user wishing to store or retrieve data sends a document containing the data or query to the network or computer access address of a system operating according to the present invention. When transmitted, the data or query is transferred to a predefined mailbox on the network system or computer access system associated with the present invention.

Referring now to FIG. 2, the user transmits data in digital form to the mailbox of the computer used in accordance with invention through data link 210. Data link 210 is capable of transferring digital information between two users. For example, the data link can be a sophisticated network system, such as a wide area network (WAN) or a value-added network (VAN). A WAN is a communications network that connects geographically separate areas, while a VAN is a communications network that offers additional services besides communications connections and data transmission, such as message routing, resource management and data conversion capabilities. The data link on a WAN or VAN system is established by accessing an electronic address on the relevant system and directing the data over the WAN or VAN to the address unique to a system operating the method of the present invention.

Similarly, data link 210 can be represented by a limited network system such as a local area network (LAN). A LAN is a communications network dispersed over a relatively limited area and connected by a communications link that enables any device to interact with any other device on the network. The data link on a LAN system is established by designating a device that operates according to the present invention, and transmitting the data over the LAN from the user to that device.

Finally, data link 210 can be represented by a computer access system. A computer access system is a system that transfers information among the input/output channel, the processor and the memory. The data link on a computer access system allows a user to use a telecommunications device, such as a modem, to establish a connection between the user's computer system and a computer system used for the present invention.

THE STORAGE PROCESS

The data downloaded from data link 210 possesses various attributes, including a user designation, a data identification value, various data values, the body of information, and associated commands. Referring now to FIGS. 2, 3, 4 and 5, the present invention stores data in the following manner. Router 220 receives data from data link 210 by periodically checking data link 210 and downloading any new data received by data link 210 through a channel 215. Channel 215 is a path or link internal to the computer platform 105 through which data passes between two devices.

The purpose of router 220 is to receive the data and forward the data to a storage/retrieval processor 245 designated to receive data from the user. The router 220 accomplishes this routing process by referencing the data's user designation against an account database 225 and a volume database 230 to determine the storage/retrieval processor relevant to the user.

Figure 3:
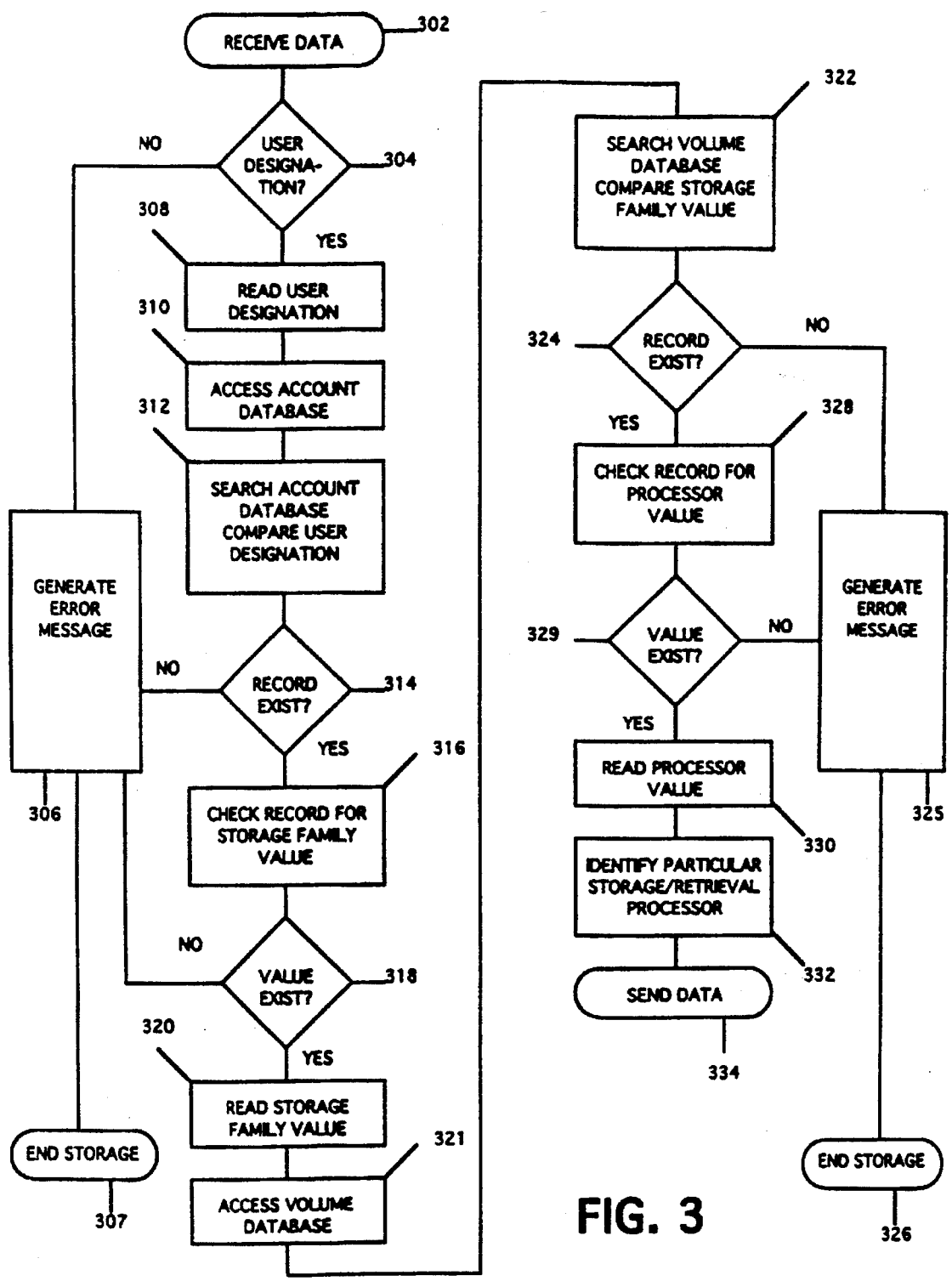
FIG. 3 depicts a flowchart of the operation of the router in the storage process according to the present invention.

In detail and referring to FIG. 3, router 220 receives the data (step 302), examines the downloaded data and reads the user designation contained in the data (step 304). If the data does not contain a user designation, an error message is generated (step 306) and the storage procedure is terminated (step 307). If the data does contain a user designation, router 220 reads this value (step 308) and accesses account database 225 (step 310).

Figure 5A:
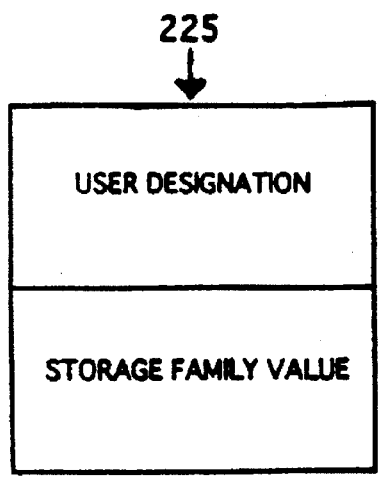
FIG. 5a is a diagram representation of the record attributes in the account database.

Router 220 then searches account database 225 for a record having a user designation identical to the user designation in the downloaded data (steps 312 and 314). If no record in account database 225 contains a user designation identical to the user designation in the data, router 220 generates an error message (step 306) and terminates the storage procedure (step 307). If a matching record exists in account database 225, router 220 reads the matching record in account database 225 for a storage family value (steps 316 and 318). If no storage family value exists, router 220 generates an error message (step 306) and the storage procedure is terminated (step 307). If a storage family value exists, router 220 reads the storage family value in account database 225 (step 320). FIG. 5A is a diagram representation of the account database 225 according to the present invention, showing the user designation and storage family values.

Figure 5B:
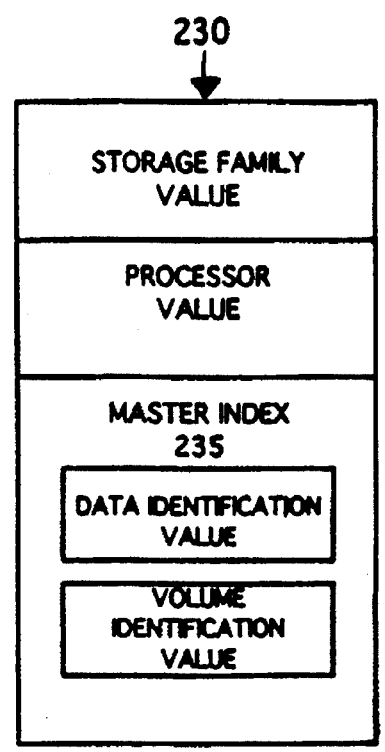
FIG. 5b is a diagram representation of the record attributes in the volume database and FIG. 5c shows a storage/retrieval processor and storage media according to the present invention.

Router 220 next accesses volume database 230 (step 321) and searches volume database 230 for a record having a storage family value identical to the storage family value read from account database 225 (steps 322 and 324). If no record in volume database 230 contains a storage family value identical to the storage family value read from account database 225, router 220 generates an error message (step 325) and the storage procedure is terminated (step 326). If a matching record exists in volume database 230, router 220 reads the matching record in volume database 230 for a processor value (steps 328 and 329). If no processor value exists, router 220 generates an error message (step 325) and terminates the storage procedure (step 326). FIG. 5B is a diagram representation of volume database 230, showing the storage family value, processor value, and master index.

Router 220 next reads the processor value (step 330) and identifies a particular storage/retrieval processor 245 with a processor value identical to the processor value read from volume database 230 (step 332). Router 220 next transmits the data through processing channel 240 to a storage/retrieval processor 245 (step 334). Processing channel 240 is a path or link, either internal or external to the computer platform 105 through which data passes between the router 220 and the storage/retrieval processor 245. The data is advanced to the particular storage/retrieval processor 245 which has a processor value identical to the processor value read from volume database 230.

The purpose of the storage/retrieval processors 245 is to locate an item of storage media associated with the user with memory space available to contain the downloaded data. The present invention may have several storage/retrieval processors 245 controlling the storage media 250; the processor value designates the particular storage/retrieval processor 245 associated with the user on which to store the data. The storage/retrieval processors 245 may operate any combination of storage media 250 configurations. For example, the storage media 250 may be online and mounted, with the media resident in drives, online and available for instantaneous data storage. The storage media 250 may also be online but not mounted, with the media resident in a queue available to be cycled online and mounted as necessary. Alternatively, the storage media 250 may be offline, with the media on external storage shelves to be mounted manually when required by the storage/retrieval processor 245.

The storage/retrieval processor 245 also creates a detailed index to the data and stores this detailed index alongside the stored data on the same item of storage media. Finally, the storage/retrieval processor 245 enters attributes of the data into a master index to facilitate the retrieval of the data.

Figure 4:
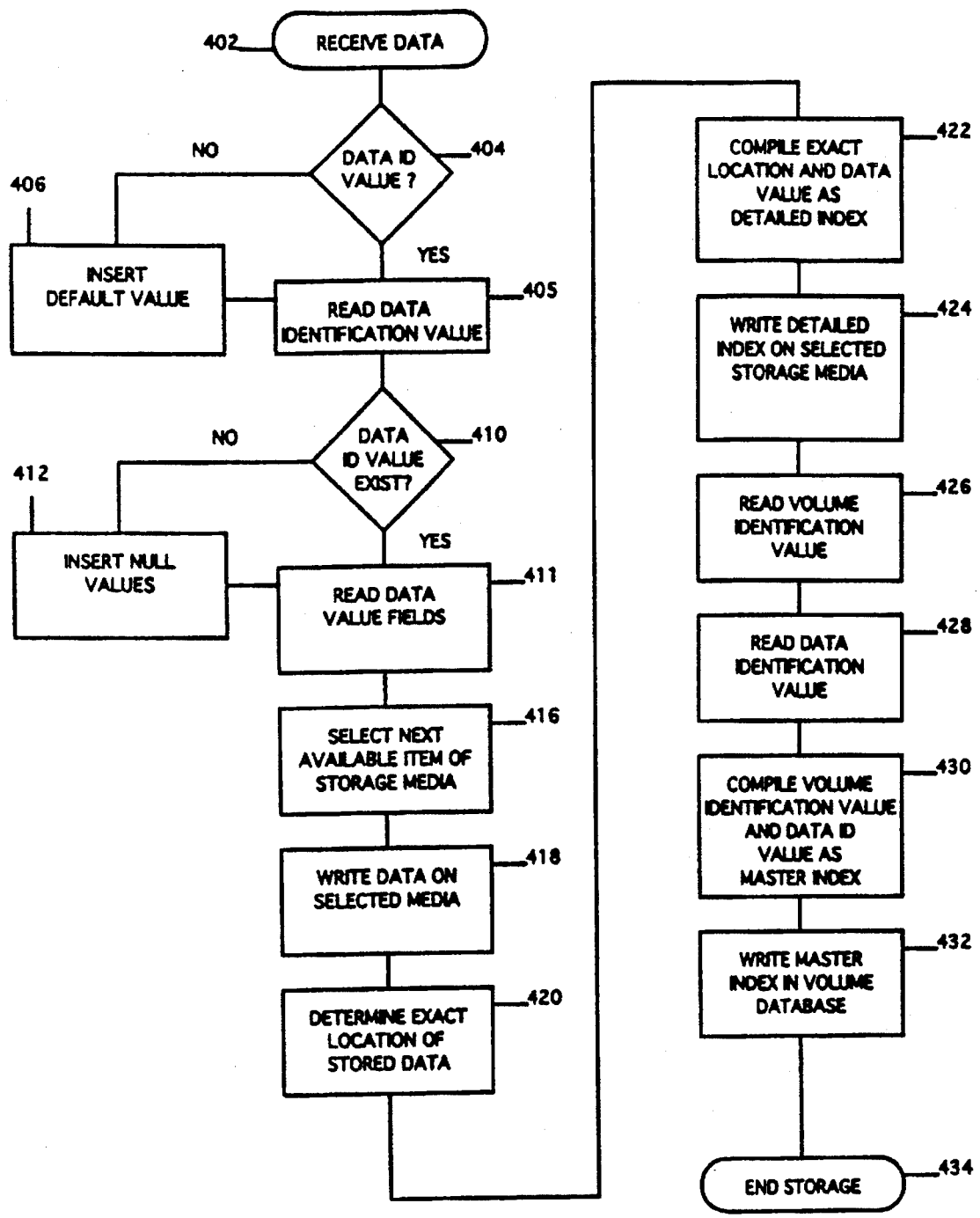
FIG. 4 depicts a flowchart of the operation of the storage/retrieval processor in the storage process according to the present invention.

In detail and referring to FIG. 4, the particular storage/retrieval processor 245 receives the data from router 220 (step 402), reads the data and extracts information contained in a data identification value (steps 404 and 405). If no information is contained in the data identification value, the particular storage/retrieval processor 245 inserts a default value (step 406) according to a preset configuration and reads that default value as the data identification value (step 405). The particular storage/retrieval processor 245 also reads the data and extracts information contained in the data values designated by the user (steps 410 and 411). If no information is contained in the various data values, the particular storage/retrieval processor 245 inserts a null value for these values (step 412) and reads that null value as the data values (step 411).

The particular storage/retrieval processor 245 also selects the next item of storage media 250 which has available memory space to contain the downloaded data (step 416). The particular storage/retrieval processor 245 then writes the downloaded data onto the selected item of storage media 250 with available memory space (step 418). The particular storage/retrieval processor 245 also determines the exact location of the stored data on the selected item of storage media 250 (step 420).

Figure 5C:
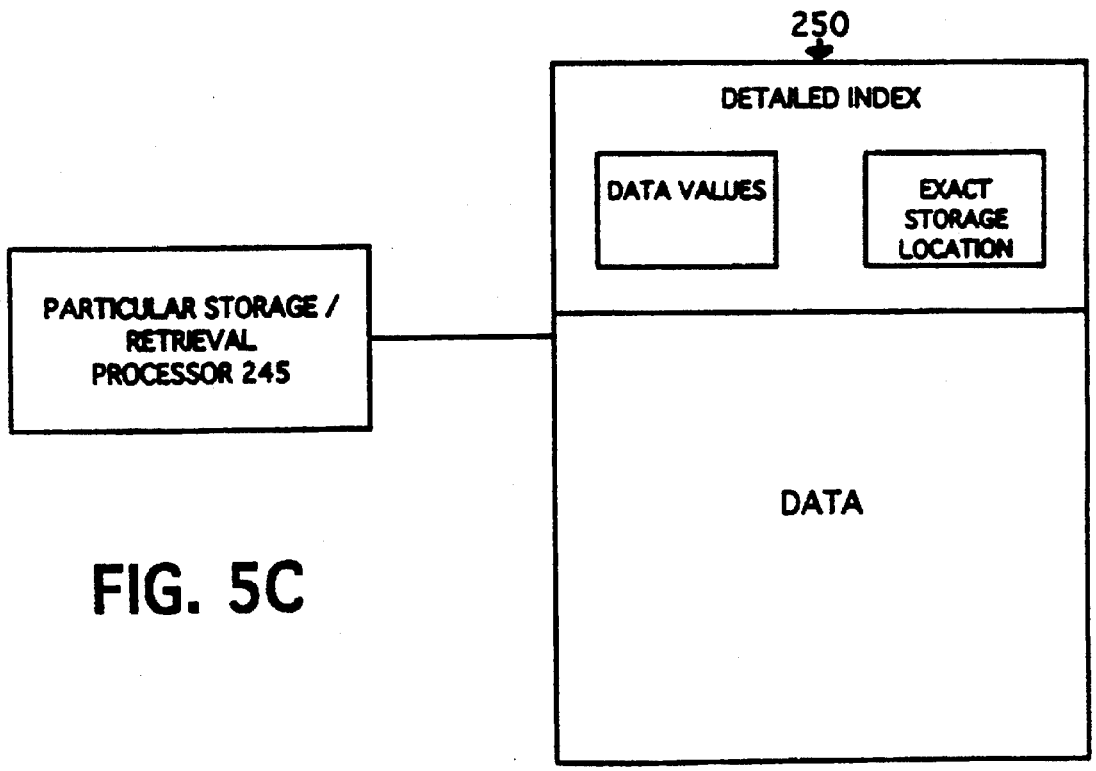

As shown in FIGS. 4 and 5C, the particular storage/retrieval processor 245 next writes two fields into a detailed index: the exact storage location of the data; and information contained in the plurality of data values. The storage/ retrieval processor 245 compiles these two fields (step 422) and writes these fields as the detailed index on the selected storage media (step 424). The detailed index is stored on the same particular item of media 250 alongside the stored data.

Finally, the particular storage/retrieval processor 245 creates a master index 235 for the data. The particular storage/retrieval processor 245 reads a volume identification value of the selected item of media containing the stored data (step 426). The particular storage/retrieval processor 245 also reads the data identification value contained in the stored data (step 428). The volume identification value and data identification value are then compiled (step 430) and written (step 432) by the particular storage/retrieval processor 245 through processing channel 240 onto a master index 235 located in volume database 230. At this stage in the process the storage procedure is terminated (step 434).

THE RETRIEVAL PROCESS

Figure 6:
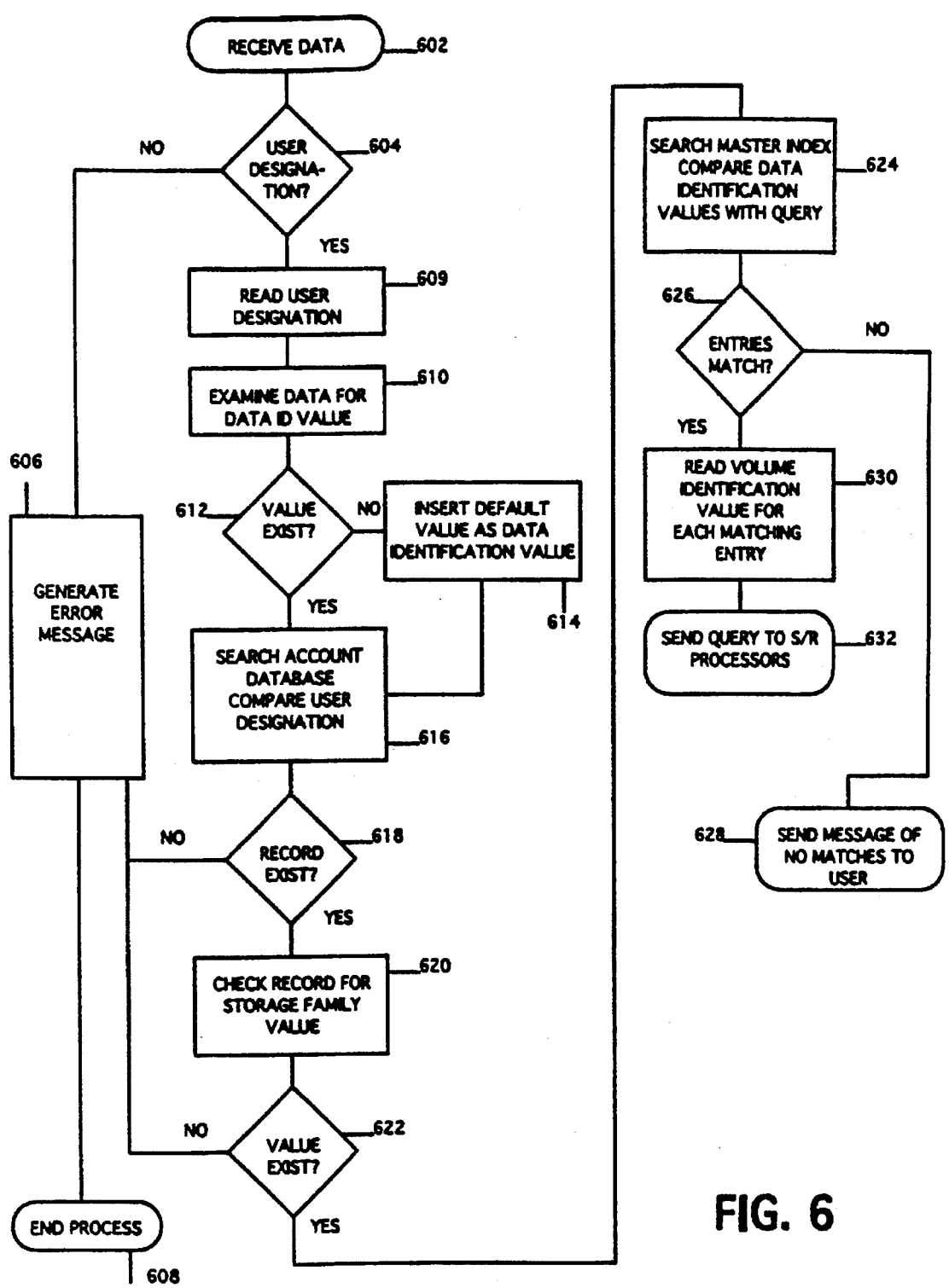
FIG. 6 depicts a flowchart of the operation of the router in the retrieval process according to the present invention.
Figure 7:
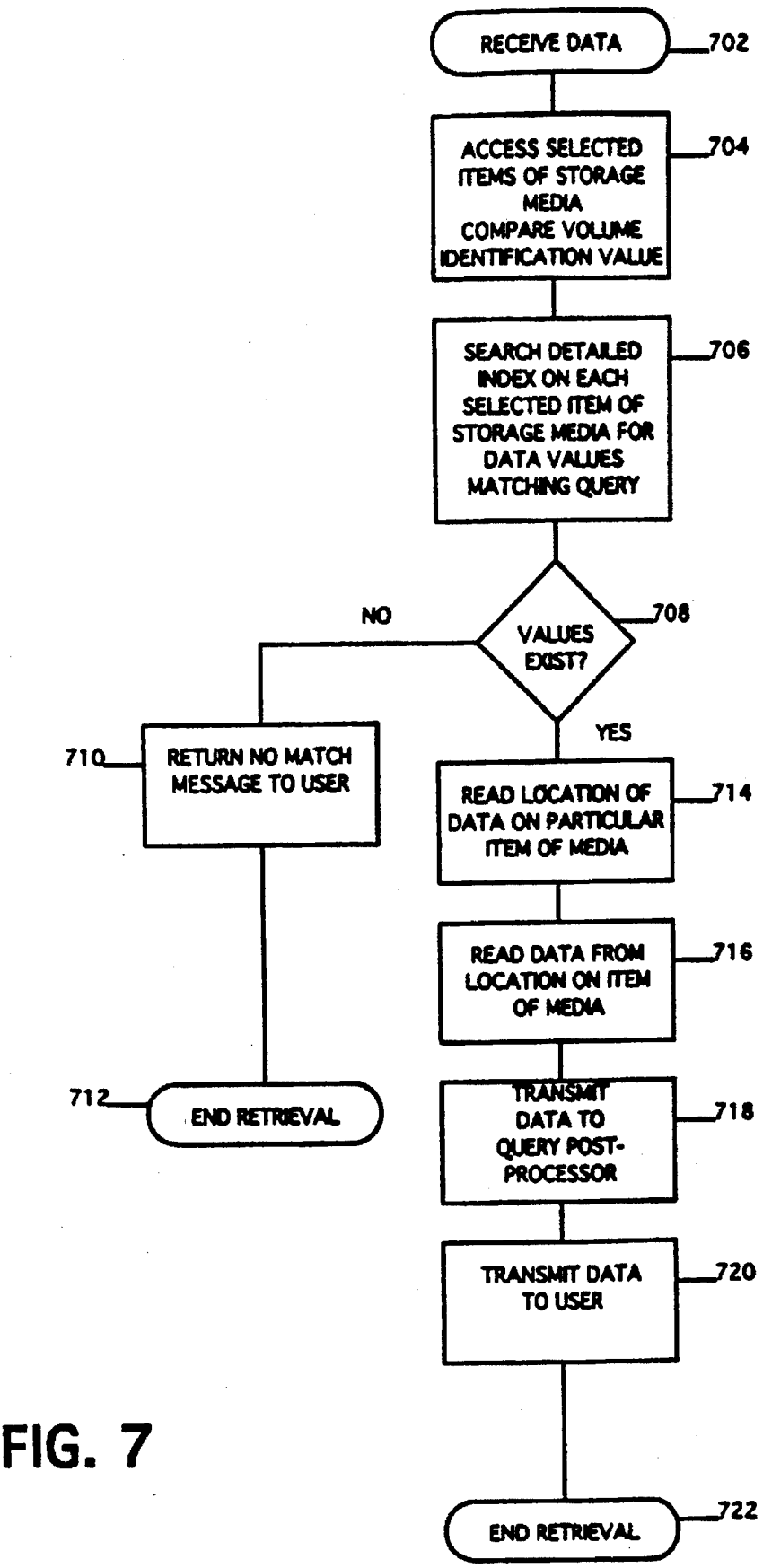
FIG. 7 depicts a flowchart of the operation of the storage/retrieval processor in the retrieval process according to the present invention.

Referring now to FIGS. 2, 6 and 7, the present invention retrieves data in the following manner. A user transmits a search query through a network or computer system to data link 210. After receipt of the user query by data link 210, the query is transmitted through channel 215 to router 220. In particular, router 220 receives a query from data link 210 by periodically checking data link 210 and downloading any new queries received by data link 210.

The process is designed to minimize retrieval time by sequentially searching a distributed system of indices, the master index and detailed index, instead of searching an entire database containing all information. The router first searches the master index to identify a list of candidate storage media matching the query parameters. From this list of candidate storage media, the storage/retrieval processor searches the detailed indices on each individual storage media matching the query parameters. A list of data matching the query parameters, along with a list of the location of that data on each individual item of storage media, is then returned to the user.

In detail and referring to FIG. 6, router 220 receives the data from data link 210 (step 602) and examines and reads the downloaded query for a user designation (step 604). If the user designation contains no information, router 220 generates an error message (step 606) and terminates the retrieval procedure (step 608). If a user designation exists, router 220 reads the user designation (step 609) and then examines the downloaded query for a data identification value (steps 610 and 612). If the data identification value contains no information, router 220 reads a preconfigured default value as the data identification value (step 614).

Router 220 then searches account database 225 for a record having a user designation identical to the user designation in the downloaded query (steps 616 and 618). If no record in account database 225 contains a user designation identical to the user designation in the query, router 220 generates an error message (step 606) and the retrieval procedure is terminated (step 608). If a record with an identical user designation exists in account database 225, router 220 reads the matching record in account database 230 to find a storage family value (steps 620 and 622). If the matching record does not contain a storage family value, router 220 generates an error message (step 606) and terminates the retrieval procedure (step 608).

Router 220 next searches master index 235 located in volume database 230 for all entries that contain a data identification value equal to the data identification value in the query (step 624). If no entries in master index 235 meet the query parameters (step 626), router 220 transmits a message to the user through data link 210 indicating that no relevant responses exist to the query (step 628). If entries in master index 235 meet the query parameters, router 220 reads the volume identification value for each matching entry from master index 235 (step 630).

Router 220 next advances the query through processing channel 240 to the storage/retrieval processor 245 (step 632). The query is advanced to the particular storage/retrieval processor 245 that operates storage media 250 with volume identification values identical to the volume identification values selected from master index 235.

Referring to FIG. 7, each particular storage/retrieval processor 245 receives data from router 220 (step 702) and accesses the selected storage device from a plurality of storage media 250 which have a volume identification value identical to the volume identification value read from master index 235 (step 704). Each particular storage/retrieval processor 245 examines the detailed index on each selected item of storage media 250. Each particular storage/retrieval processor 245 searches the detailed index on each selected item of media 250 for all entries that contain identical information in the data values of both the detailed index and the query (step 706 and 708). If no matching entries in the detailed index of each selected item of media 250 exists, storage/retrieval processor 245 sends a message to the user (step 710) and ends the retrieval process (step 712) through processing channel 240, router 220, channel 215, and data link 210. For the matching entries in the detailed index of each selected item of media 250, the particular storage/retrieval processor 245 reads all data matching the specific query (steps 714 and 716) and transmits the data to a query post-processor 255 (step 718).

The query post-processor 255 accumulates the following data: a list of data matching the query, the actual data matching the query and an error message if the query could not be fulfilled. The query post-processor 255 transmits the accumulated data to the user through processing channel 240, channel 215, and data link 210 (step 720) and terminates the retrieval process (step 722).

THE PREFERRED EMBODIMENT

Figure 8:
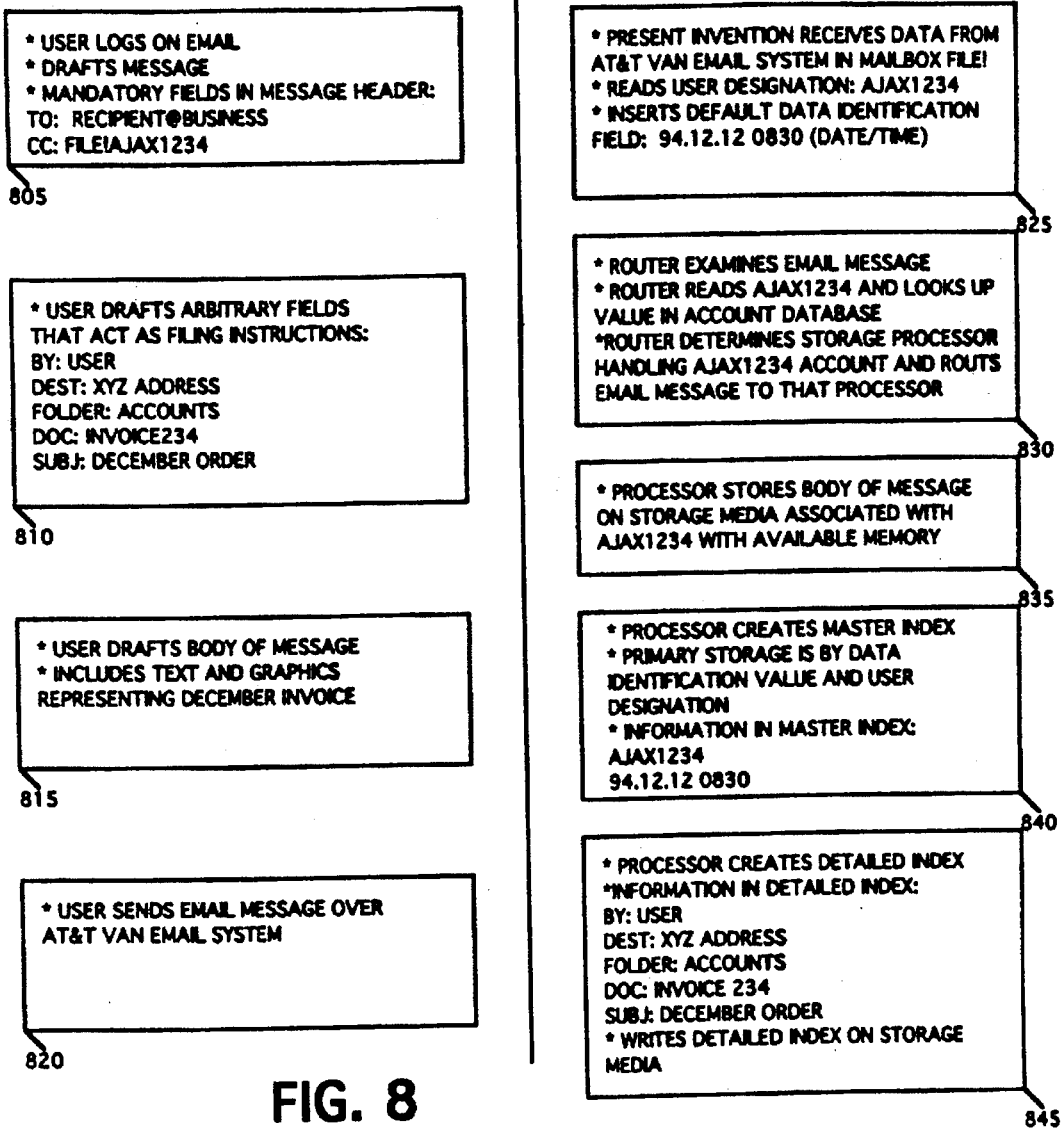
FIG. 8 is a diagram representation of the preferred embodiment of the storage process where a user sends e-mail and stores copy (with source in the left column and storage in the right column) according to the present invention.
Figure 9:
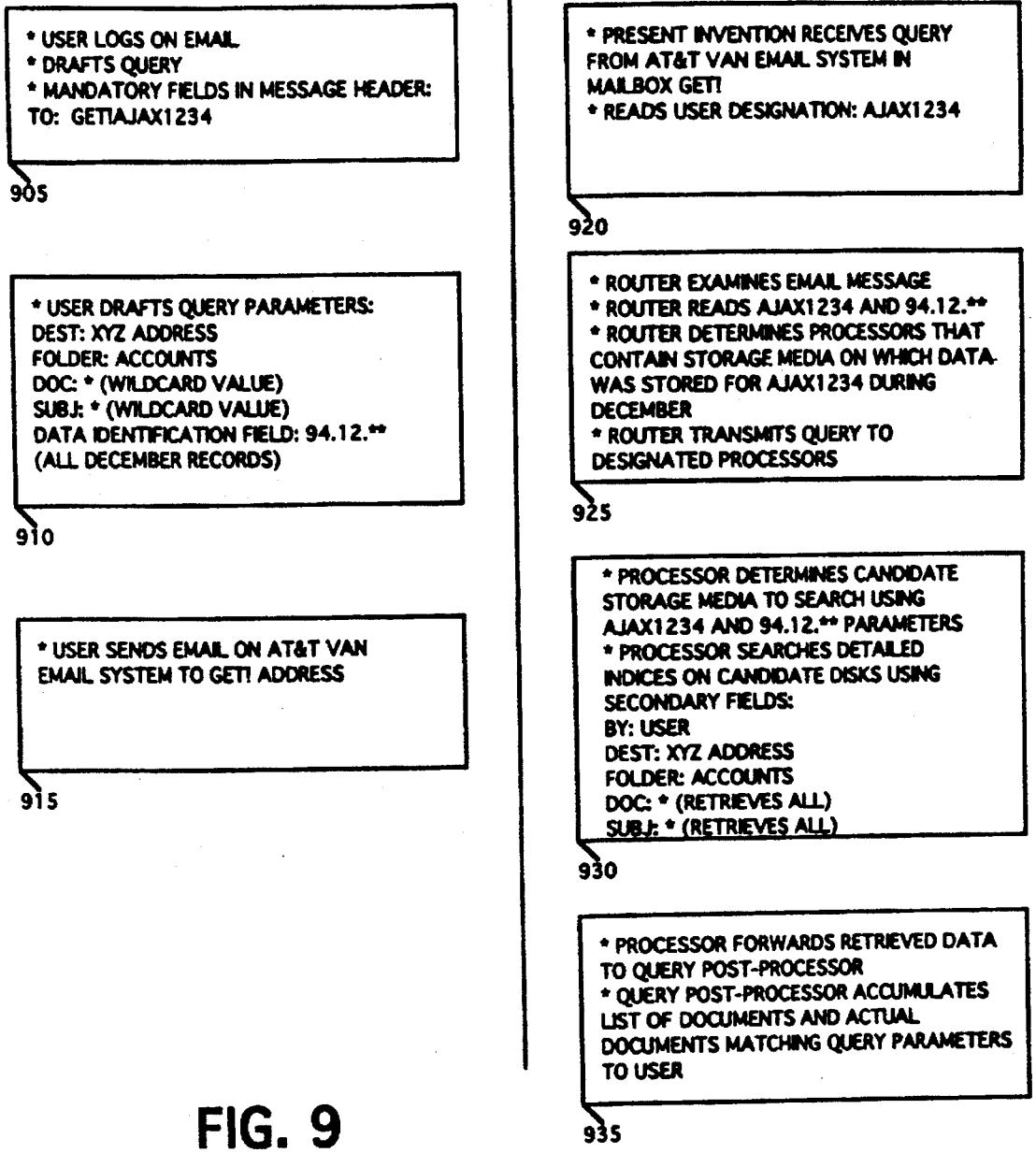
FIG. 9 is a diagram representation of the preferred embodiment of the retrieval process where a user wishes to retrieve store records (with source in the left column and the retrieval process in the right column). according to the present invention.

As shown in FIGS. 8 and 9, the preferred embodiment of the invention uses the AT&T VAN electronic mail system. The address to establish a data link for storage operations is a UNIX-based mailbox named File, while the address to establish a data link for retrieval operations is a UNIX-based mailbox named Get.

To operate the method of the present invention for data storage and retrieval, a user begins by obtaining a unique alphanumeric designation. The user designation is information embedded in the data that simplifies the indexing, storing, and retrieval of information. In the preferred embodiment, the user designation represents an electronic mail address extension. The present invention manipulates electronic mail address extensions and allows electronic mail address extensions to be used for routing and indexing even though the extensions do not represent actual names or identifiers of users or electronic mail aliases on the system. Users store data according to the present invention by sending an electronic mail message over the AT&T VAN to a mailbox address associated with entities using the present invention. This is done by including the mailbox address in either the TO:, CC:, or BCC: lines of the electronic mail message. For example, the message can be addressed To:

File! Ajax1234, where "File" is a mailbox address on the AT&T VAN system and "Ajax1234" is the user designation (step 805).

The data to be stored may also possess the following attributes:

1. Data identification value. The data identification value is, in addition to the user identification value, a field used to enable the manipulation of the digital data transmission. The data identification value can be the date, for example, in Greenwich Mean Time, that the AT&T VAN system transmits the message to the mailbox address. However, a user may configure the data identification value differently. For example, this field may be configured as the user's zip code. A user may even have the data identification value entered automatically by router 220 according to a preconfigured value.

2. Various data values. These values represent other data fields relevant to the storage and retrieval of data. In the electronic mail message, key word values are designated in either the header or body of the message, but not in the TO:, CC:, or BCC: fields, by the words immediately following a colon. In the preferred embodiment of the present invention, these key words include SUBJECT:, BY:, DEST:, FOLDER:, and DOC: (step 810).

3. Body. The body of the data is all information after the last line containing a data identification or key word field (step 815).

The user then sends the electronic mail message, containing data identification values and various data values, if any, and a user designation, over an AT&T VAN electronic mail system (step 820).

During the store process, the router receives and examines the electronic mail message for the user designation (step 825). The router compares this user designation with an index of all users to determine which particular storage processor controls the storage of data belonging to the user. The router then transfers the electronic mail message to the appropriate storage processor (step 830).

Once the incoming message has arrived at the storage processor, the data parsing continues. The storage processor first searches for the user designation information and data identification value. These two primary index criteria determine on which particular piece of media the information will be stored. Beyond these two primary items of information there can be any number of secondary index fields. The number of secondary index fields can be adjusted based on custom applications appropriate to the user's needs. These secondary index fields act as filters for future search and retrieval operations. Distributing the index fields into two broad categories facilitates the search and retrieval functions because, unlike traditional databases, the secondary index fields do not need to be accessed by separate and individual queries into the master index. The storage processor stores the message on a storage device relevant to the user (step 835), creates a master index using the user designation and data identification value (step 840), and creates a detailed index using the data values (step 845).

Users retrieve data by sending an electronic mail message over the AT&T VAN system to a mailbox associated with an entity using the present invention. For example, the message can be addressed TO: GET! Ajax 1234, where "GET" is the mailbox address on the AT&T VAN system and "Ajax 1234" is the user designation (step 905).

The user also creates the query parameters, inputting values in the data identification field and other fields to use as searching criteria (Step 910). The user sends the query as an electronic mail message over an AT&T VAN electronic mail system (step 915).

The query is a series of ASCII text lines which contain the search instructions used to locate the relevant data and transmit that data back to the user. Upon receipt of the electronic mail message, the information is parsed from the request to determine the user designation, the data identification value and any of the other seven data values used to assist in the search for relevant data (step 910).

The present invention obtains its fast retrieval times through the use of distributed master and detailed indices. The router receives the query and reads the user designation information (step 920), examines the query, and determines the candidate storage/retrieval processors that operate media that may contain the information (step 925). Using the user designation, the message is routed to a query processor for retrieval of the information.

The processor then determines which item of media may contain data matching the query, searches these items of media (step 930), and forwards any matching results to a query post-processor (step 935). The query post-processor then forwards data matching the query to the user (step 935). Depending upon the specificity of the request or the number of key word values supplied by the user, a list of data, or the actual data, is retrieved, packaged and mailed to the user's mailbox on the AT&T VAN system.

Index and filing information are created within the electronic mail message. The primary index criteria are the user designation information and data identification value contained in the message, while the secondary index criteria are the various data values. The present invention manipulates and operates this information in such a manner to enable the efficient storage and retrieval of data contained in the body of the electronic mail message. This indexing scheme is accomplished by placing part of the index on the piece of media that contains the data relating to that particular part of the index. This scheme allows the system to load an item of media without having to know the exact sector and segment on that item of media that contains the data.

The distributed indexing scheme significantly reduces the search and retrieval throughput time of request and searches. As the media is brought resident to the drive by the robotic jukebox and is spun up on the drive for reading, the drive first reads the portion of the index scheme which resides on that disk and determines exactly where the data that is being requested resides on the disk. That data is then read from the disk and sent to the query post-processor to be packaged and mailed back to the requester.

This process of spinning the disk, reading the index and retrieving the data after the media is brought resident to the drive takes approximately 700 milliseconds. If a system uses an indexing scheme inherent in traditional database architectures, several queries would have to be made to the database to work through the various filtered fields. The system would then have to determine which particular item of media contained the data and the exact sector or segment on which the data was stored.

Each of these searches requires at least three-tenths of a second, and up to nine of these searches might be required to enable the system to be able to identify the requested data. After performing these multiple searches, the system would then have to send a message to the Jukebox to load the particular item of media.

If the index volume increases, the amount of time required for each level of searches also increases. Indexing schemes associated with traditional database architectures can quickly grow up to forty terabytes in size. The amount of time required to locate data within this large index can take several minutes. Because the system is designed to process tens of thousands of requests a day, it would not be feasible to use such a system with the traditional database indexing structures. However, the present invention's system of distributing the data indices permits the high speed search and retrieval of data. Dividing indices into small functional groups and distributing the various pieces of these indices on processors and media results in no one portion of the index becoming unmanageable due to its large size. Additionally, no one processor is required to handle large indexes or searches.

CONCLUSION

There are many other embodiments of the present invention. For example, the data can be sent to the storage system by a direct link to a telecommunications device, rather than type an electronic mail message. Similarly, retrieval queries can be processed by a direct link to a telecommunications device rather than through an electronic mail message, and the storage media can be hard or floppy disks, magnetic tapes, or other devices instead of an optical storage disk.

The present invention may also store and retrieve data with a preset user designation automatically recognized by the system. In this configuration the user will transmit data over a dedicated data link 210 to a dedicated storage/retrieval processor 245. The dedicated storage/retrieval processor 245 then identifies the appropriate item of storage media 250 for storage and retrieval of the data. In addition, the present invention may store and retrieve data by having router 220 automatically enter preconfigured user designation information.

As will be understood by those skilled in the art, many changes in the apparatus and methods described above may be made by the skilled practitioner without departing from the spirit and scope of the invention, which should be limited only as set forth in the claims which follow.

We claim:

1. A method for storing data containing: (1) a plurality of fields including a data identification field and a field containing additional information, and (2) a user designation, comprising:

upon receipt of the data, examining the data identification field and the user designation, and on the basis of these two items of information alone, selecting a unique and predetermined item or set of items of media on which the data will be stored; and storing the data on that unique item or set of items of media.

2. The method of claim 1 including the additional step of creating an index and storing that index on the unique item or set of items of media, the index being used to locate the stored data within the unique item or set of items of media.

3. The method of claim 1 wherein the unique item or set of items of media is one or more optical disks.

4. A method for retrieving stored data containing: (1) a plurality of fields including a data identification field and a field containing additional information, and (2) a user designation, comprising:

based upon the data identification field and the user designation, selecting a unique and predetermined item or set of items of media on which the data to be retrieved has been stored;

locating within the selected item or set of items of media the stored data; and retrieving the stored data from the selected item or items of media.

5. The method of claim 4 wherein the selected item or items of media contain an index providing the location of the stored data within the selected item or items of media, and that index is used to locate the stored data within the item or items of media.

6. The method of claim 1 wherein the method is performed by a storage/retrieval processor system.

7. The method of claim 4 wherein the method is performed by a storage/retrieval processor system.

8. The method of claim 1 wherein the user designation is an electronic mail address extension.

9. The method of claim 4 wherein the user designation is an electronic mail address extension.

* * * * *